(12) United States Patent
Cathenaut et al.

(10) Patent No.: US 6,758,056 B1
(45) Date of Patent: Jul. 6, 2004

(54) APPARATUS AND PROCESS FOR MOLDING FROZEN ICE CONFECTIONERY COMPOSITIONS INTO ARTICLES

(75) Inventors: Philip Igor Cathenaut, Beauvais (FR); Bruno Delande, Marseille Beauvaisis (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/407,166

(22) Filed: Apr. 7, 2003

Related U.S. Application Data

(60) Continuation-in-part of application No. 09/796,573, filed on Feb. 28, 2001, now Pat. No. 6,543,248, which is a division of application No. 09/310,390, filed on May 12, 1999, now Pat. No. 6,534,106.

(51) Int. Cl.[7] .................................................. A23G 9/00
(52) U.S. Cl. ........................ 62/345; 425/448; 426/389
(53) Field of Search ............................ 62/69, 70, 344, 62/345; 425/448, 449; 426/317, 389, 515, 519, 524, 565

(56) References Cited

U.S. PATENT DOCUMENTS

| | | | |
|---|---|---|---|
| 1,685,460 A | 9/1928 | Myers et al. | |
| 1,693,988 A | 12/1928 | Kuhn | |
| 1,801,578 A | 4/1931 | Stevens | |
| 3,166,025 A | 1/1965 | Hulse | |
| 3,437,722 A | 4/1969 | Cronin et al. | 264/48 |
| 3,632,245 A | 1/1972 | Getman | 425/13 |
| 3,989,492 A | * 11/1976 | Keyes | 62/136 |
| 4,188,768 A | 2/1980 | Getman | 53/282 |
| 4,346,120 A | 8/1982 | Morley et al. | 426/565 |
| 4,417,610 A | * 11/1983 | Waldstrom et al. | 141/91 |
| 4,477,473 A | 10/1984 | Schoonmaker et al. | 426/231 |
| 4,566,612 A | 1/1986 | von Kreuter | 222/309 |
| 4,648,829 A | 3/1987 | Cattani | 425/326.1 |
| 4,659,575 A | 4/1987 | Fiedler | 261/121.1 |
| 4,703,628 A | * 11/1987 | Togashi et al. | 62/135 |
| 4,746,523 A | 5/1988 | Binley | 426/249 |
| 4,916,920 A | 4/1990 | Weis et al. | 62/342 |
| 5,069,364 A | 12/1991 | McGill | 222/95 |

(List continued on next page.)

FOREIGN PATENT DOCUMENTS

| | | |
|---|---|---|
| EP | 0454491 A2 * | 10/1991 |
| GB | 992262 | 6/1963 |
| GB | 2230057 | 10/1990 |
| WO | WO 89/05096 | 6/1989 |
| WO | WO 95/16134 | 6/1995 |

*Primary Examiner*—William E. Tapolcai
*Assistant Examiner*—Mohammad M. Ali
(74) *Attorney, Agent, or Firm*—Winston & Strawn LLP

(57) ABSTRACT

The present invention relates to an apparatus for preparing frozen ice confectionery articles including a freezer having a freezer pump that cools and transports the frozen confectionery material, a rotative distributor that receives it under pressure and distributes it into flexible pipes, and a slidable filler that includes a motor having a pre-programmable motion pattern to provide a desired pattern of deposition into a plurality of molds while sliding the filler toward and away from the molds, a plurality of nozzle pipes to deposit the material, and a metering device, wherein each mold receives frozen ice confection material from a corresponding nozzle pipe that discharges the same under a pressure greater than atmospheric pressure into the mold. Also included are methods of preparing frozen confectionery articles as well as frozen confectionery articles having the smoother texture of extruded products and at least about 50 weight percent water.

12 Claims, 3 Drawing Sheets

U.S. PATENT DOCUMENTS

| | | | | |
|---|---|---|---|---|
| 5,142,872 A | * | 9/1992 | Tipton | 62/616 |
| 5,172,835 A | | 12/1992 | Hudcovic et al. | 222/380 |
| 5,435,143 A | | 7/1995 | Heinrich | 62/75 |
| 5,464,120 A | | 11/1995 | Alpers et al. | 222/1 |
| 5,584,190 A | * | 12/1996 | Cole | 62/260 |
| 5,718,354 A | | 2/1998 | Binley | 222/1 |
| 5,738,895 A | | 4/1998 | Fuchs et al. | 426/515 |
| 5,758,571 A | | 6/1998 | Kateman et al. | 99/455 |
| 5,894,030 A | | 4/1999 | Gibson et al. | 426/524 |
| 5,948,456 A | | 9/1999 | Jones et al. | 426/100 |
| 6,006,535 A | | 12/1999 | Cathenaut | 62/345 |
| 6,187,365 B1 | | 2/2001 | Vaghela et al. | 426/565 |

* cited by examiner

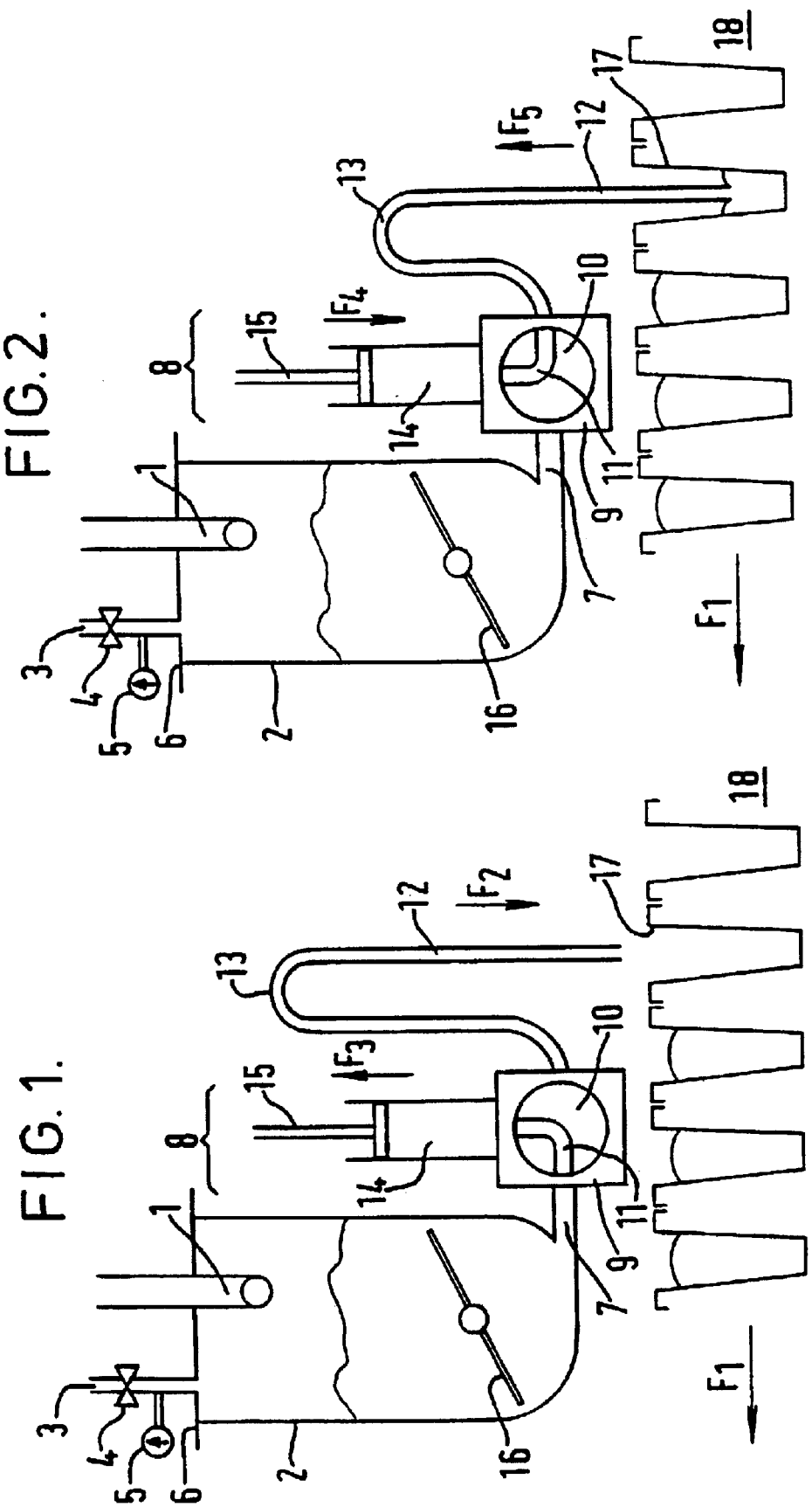

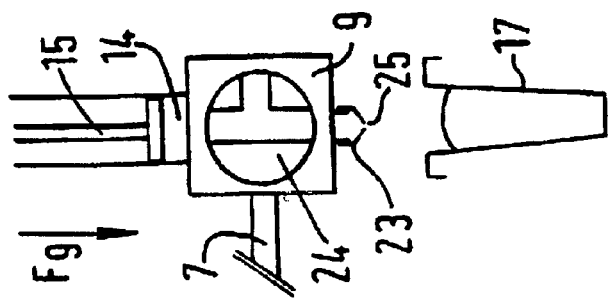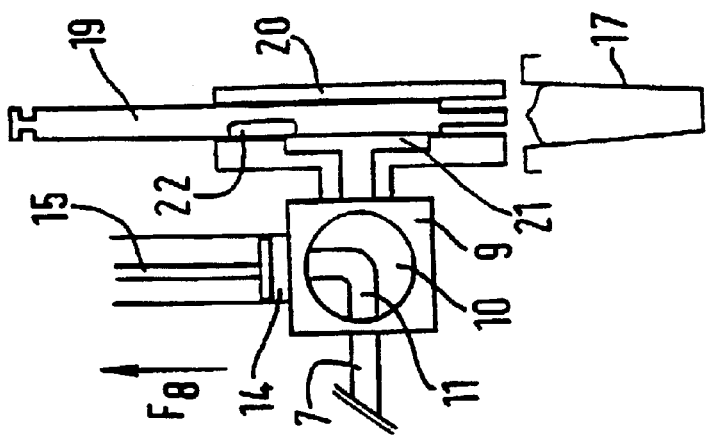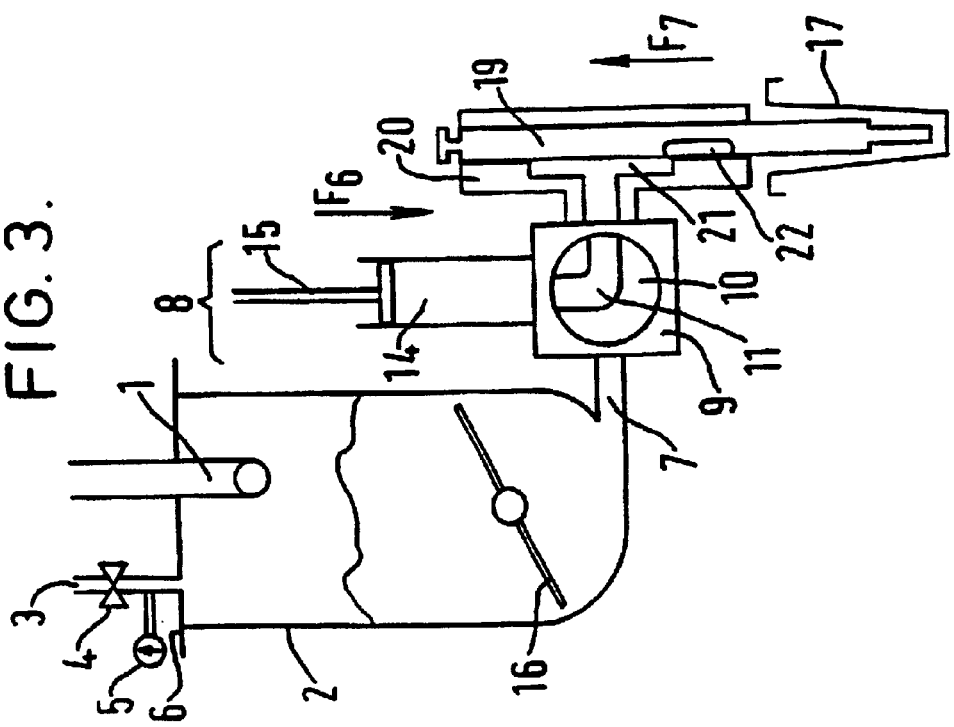

APPARATUS AND PROCESS FOR MOLDING FROZEN ICE CONFECTIONERY COMPOSITIONS INTO ARTICLES

CROSS REFERENCE TO RELATED APPLICATIONS

This application is a continuation-in-part of U.S. patent application Ser. No. 09/796,573, filed Feb. 28, 2001 now U.S. Pat. No. 6,543,248, which is a divisional application of U.S. patent application Ser. No. 09/310,390, filed May 12, 1999, now U.S. Pat. No. 6,534,106. The entire contents of each prior application is incorporated herein by express reference thereto.

FIELD OF THE INVENTION

The present invention relates to preparation of frozen confectionery articles and more particularly to an apparatus for preparing the articles that delivers a confectionery substance to molds for molding into frozen articles, methods of making such articles, and molded frozen confectionery articles formed with minimal or no air pocket.

BACKGROUND OF THE INVENTION

Small frozen confectionery sticks are manufactured on an industrial scale by means of molding or by means of extrusion.

When extrusion is employed, a sausage shape of plastic consistency, which is relatively hard at a temperature of the order of −6° C. to −7° C., is extruded vertically at the exit from a freezer and then cut into sections. Extrusion gives the products a fine, less crystallized texture than that of molded products. The fine texture obtained by means of extrusion is largely due to the freezing conditions in a freezer and, in particular, to the freezing temperature at the exit from the freezer. That is to say, the lower the temperature, fewer large crystals are formed. This means that the faster the freezing, the smaller the ice crystals and the finer the texture. In a freezer, freezing speed is at its maximum thanks to mixing and to the continual scraping of the wall which allow accelerated freezing of the water. A drawback of this method is that the shape of the extruded products is limited.

The freezing of a liquid composition to be frozen by means of molding through simple thermal conduction in a mold immersed in a refrigerating solution is slower and leads to the formation of considerably larger crystals. In this process, the composition to be frozen is always metered out in the liquid state into molds with a view to guaranteeing satisfactory filling and to preventing the creation of air pockets, and its temperature is of the order of −2° C. to −3° C. The proportion of frozen water is low and most of the process of freezing the product takes place in the molds. This explains the presence of a coarser, more crystallized texture, owing to an increase in the size of the crystals.

U.S. Pat. No. 3,632,245, for example, describes an apparatus for multi-track manufacturing short frozen sticks by means of molding, in which rows of cells are simultaneously filled with a metered quantity of liquid composition to be frozen from distribution hoppers associated with volumetric metering devices comprising-cylinders constituting metering chambers in which the liquid is successively aspirated and then expelled by means of metering pistons. After this filling operation, the cells travel in a refrigerating liquid so that the articles are frozen. As the composition to be frozen is liquid, the mere drop in pressure created by the displacement of the piston in its chamber allows perfect filling of the cylinders. Thus, identical filling of the cylinders allows the simultaneous metering of an identical volume into the molds for all the tracks.

It is desired to have an apparatus that is more suitable for providing frozen molded confectionery products having the texture of an extruded product, and methods for making the same.

SUMMARY OF THE INVENTION

The invention relates to an apparatus for preparing frozen ice confectionery articles including: a freezer including a freezer pump that cools confectionery material so as to provide a frozen ice confectionery material and transports the frozen confectionery material through the apparatus, a rotative distributor that receives the frozen ice confectionery material from the freezer at a pressure greater than atmospheric pressure and distributes frozen material into each of a plurality of flexible pipes, and a slidable filler including a motor having a pre-programmable motion pattern to provide a desired pattern of deposition of the material into a plurality of molds while sliding the filler toward and away from the molds, a plurality of nozzle pipes operatively associated with the motor, wherein each nozzle pipe corresponds to each of the flexible pipes, and a time elapse rotative valve to facilitate control of the amount of frozen confectionery material arriving from the flexible pipes that is discharged to the nozzle pipes while maintaining the frozen ice confectionery material at a pressure greater than atmospheric pressure, wherein each mold receives frozen ice confection material from a corresponding nozzle pipe that discharges the same under a pressure greater than atmospheric pressure into the mold to provide a frozen confectionery article in a desired shape.

In a preferred embodiment, the freezer cools and the freezer pump conveys confectionery material to a temperature of to about −5° C. to −7° C. This advantageously provides suitably small ice crystals that remain in the frozen confectionery material as it is transported through the system and deposited in the molds. In another preferred embodiment, the rotative distributor is directly connected to the freezer via a pressurized pipe. In yet another preferred embodiment, the rotative distributor meters substantially the same amount of frozen confectionery material into each flexible pipe.

In one embodiment, the gauge pressure on the frozen confectionery material just after exiting the freezer is about 6 bar to 8 bar. The pressure can be maintained at this level throughout the system if desired. In a preferred embodiment, the gauge pressure on the frozen confectionery material at the rotative distributor is about 3 bar to 7 bar. In another preferred embodiment, the gauge pressure on the frozen confectionery material at the time elapse rotative valve is about 1.5 bar to 4 bar. Preferably, the pressure is about 1.5 up to 2 bar when the material is deposited into the molds.

In one embodiment, 5 to 20 nozzle pipes are included with an equivalent number of corresponding flexible pipes and molds. In another embodiment, the desired pattern of deposition in the molds is tri-dimensional. Preferred tri-dimensional patterns include a cylinder or tapered cylinder, a cone or tapered cone, or a substantially rectangular shape or tapered version.

In one embodiment, the slidable filler is adapted and configured to deposit sufficient frozen confectionery material to result in an average of less than about 8 volume percent voids remaining in the molds. Preferably, less than about 5 volume percent, and more preferably less than about 3 volume percent voids remain in the molds and the resultant products.

In one embodiment, the time elapse rotative valve turns or pivots in a casing and the nozzle pipes slide in such a manner that each descends into the mold at the start of filling, rises during filling, and re-emerges from the container at the end of filing. Preferably, the opening of the nozzle is sufficiently narrow to allow the ice cream to be fluidified by means of shearing.

The invention also relates to methods for preparing a molded ice confectionery article by preparing a frozen ice confectionery composition including at least about 50 weight percent water in a solidifying environment and applying a pressure thereto to facilitate transport of the composition, continuously feeding the frozen ice confectionery composition at a sufficient temperature and pressure to transport it from the solidifying environment into a rotative distributor, delivering the pressurized frozen ice confectionery composition from the rotative distributor in substantially equal amounts to a plurality of paths, providing an amount of frozen ice confectionery composition sufficient to fill a mold on each path using a slidabie nozzle, and discharging the sufficient amount of the frozen confectionery composition under a pressure greater than atmospheric pressure and under frozen conditions from the slidable nozzle into the mold to provide the molded ice confectionery article.

In one embodiment, the pressure is sufficient to transport the composition from the solidifying environment into each mold at a pressure of about 1.5 to 2 bar when the composition is discharged into each mold. In another embodiment, the feeding of the composition into the rotative distributor is at a pressure of about 4 bar to 8 bar. Preferably, the sufficient pressure for transporting is entirely provided by a freezer pump that also cools the frozen ice confectionery composition to a temperature of about $-5°$ C. to $-7°$ C. In another embodiment, the nozzle pipes slide so that each descends into a corresponding mold at the start of filling, rises during filling, and re-emerges from the mold at the end of filling. Optionally, but preferably, the opening of the nozzle is sufficiently narrow to allow the frozen confectionery material to be fluidified by means of shearing.

The invention also relates to the resultant molded ice confectionery products. In one embodiment, a molded ice confectionery product including from about 50 to 80 weight percent frozen water and at least one flavoring agent can be provided, wherein the frozen water comprises ice crystals having an average particle size diameter of less than 40 $\mu$m and wherein the product has less than about 3 volume percent air pockets. Preferably, greater than 50 weight percent water is included, and in another embodiment about 55 to 70 weight percent water is included. In one embodiment, the ice confectionery product comprises ice cream having a water content of about 55 weight percent to about 70 weight percent. In another embodiment, the ice confectionery product further includes a layer of chocolate that surrounds substantially all of the ice confectionery product and the at least one flavoring agent.

BRIEF DESCRIPTION OF THE DRAWINGS

The invention may be better understood by reference to the accompanying drawings, which depict certain embodiments of the invention.

FIG. 1 is a diagrammatic view of the device during the phase of filling the metering chambers;

FIG. 2 is a diagrammatic view of the device of FIG. 1 during the phase of filling a molds;

FIG. 3 is a diagrammatic view of a variant of the device just prior to the filling of a molds;

FIG. 4 is a partial diagrammatic view of the device of FIG. 3 just after the filling of a molds;

FIG. 5 is a partial diagrammatic view of a second variant of the device just after the filling of a mold.

DETAILED DESCRIPTION OF THE PREFERRED EMBODIMENTS

Figure 6:
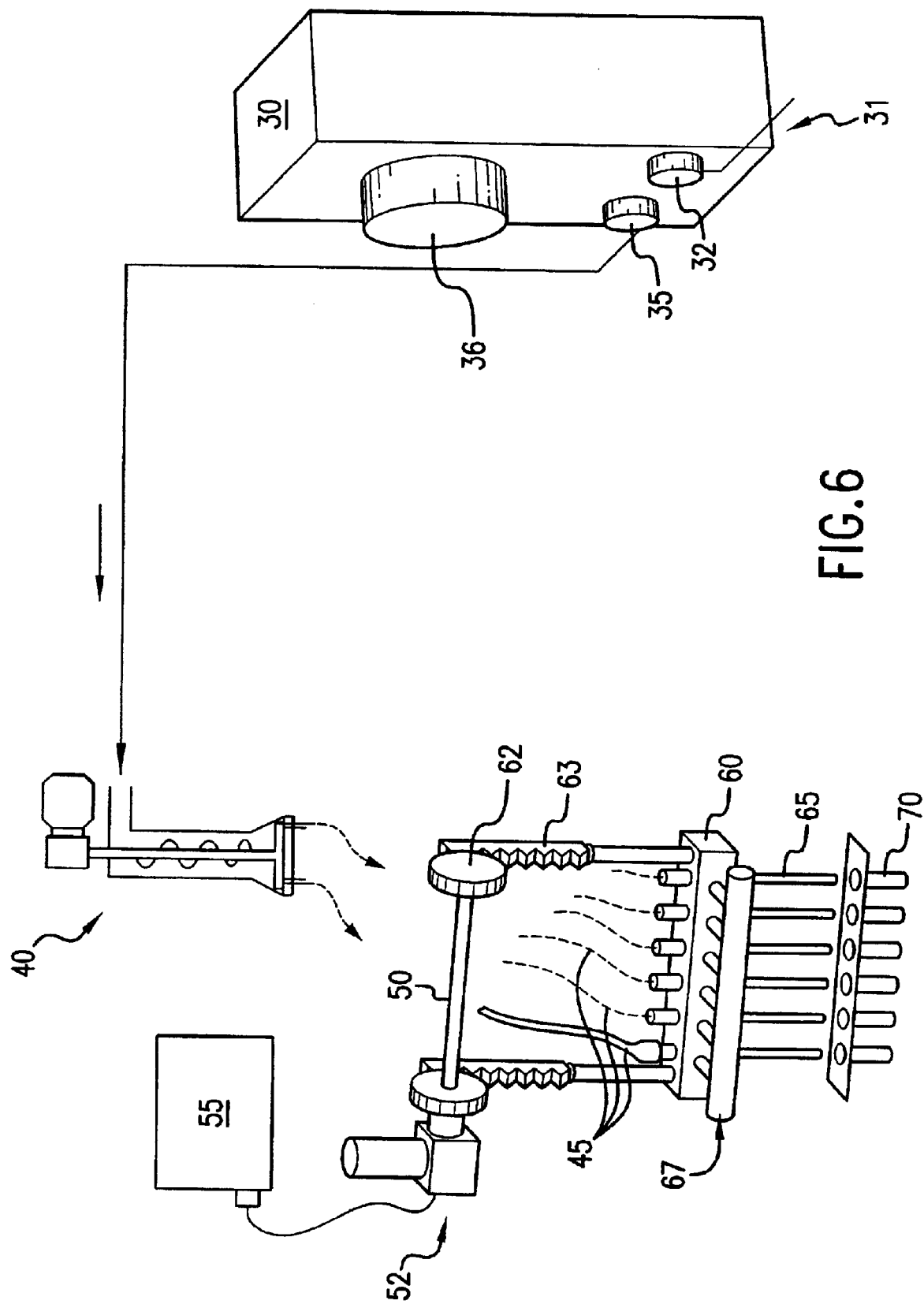
FIG. 6 is a schematic overview of another embodiment of the apparatus having a rotative distributor according to the invention.

It has now been discovered that improved frozen ice confectioneries can be prepared by one of several embodiments of the present invention. In one embodiment, an air-tight hopper and volumetric filler can be used to measure pre-determined amounts of frozen ice confectionery product into molds to provide the confectioneries of the invention. In another embodiment, a dynamic distributor is used to split the frozen confectionery material into substantially equal amounts of flow along different paths, and a slidable filler is used to provide bottom-up filling of molds to achieve the surprising and unexpected benefits of the present invention. In each embodiment of the invention, frozen ice confectionery products are produced having smaller ice crystals, fewer air pockets, or both compared to conventional molded frozen confectionery products.

In the context of the present invention, a hard ice confectionery composition is an ice cream, which may be a frozen cream, a milk ice, or a water ice, which may or may not be aerated, and the term "hard ice confectionery composition," "ice confectionery composition," "frozen ice confectionery material," or the like, is used herein to refer to such compositions without distinction. In the present invention, the hard ice confectionery ice composition is prepared in and emerges from a freezer at a temperature of from $-6°$ C. to $-7°$ C. Its texture is firmer than a conventional liquid composition to be frozen and it has a percentage of frozen water relative to the total water of the recipe of about 50 weight percent or more, particularly about 50 to 80 weight percent, depending on the composition of the mixture to be frozen. Another preferred water content is about 55 to 70 weight percent. The hard confectionery composition, particularly an ice cream, may contain inclusions such as, for example, pieces of dried or candied fruit, pieces of jelly or fondant, crunchy pieces, sauce, caramel pieces, or pieces of chocolate or biscuit.

The process of the present invention may be carried out with a device for molding frozen confectionery articles by filling containers passing through a solidifying environment with a predetermined volume of a hard ice confectionery composition and which comprises:

a distribution hopper containing the composition;

means for metering the composition which are linked to the hopper, comprising a metering chamber, a metering element, a metering nozzle and a valve communicating either with the hopper and the metering chamber during the aspiration phase or with the metering chamber and the metering nozzle during the filling phase; and which is characterized in that the hopper is sealed and non-deformable and in that the device comprises means for maintaining a pressure, i.e., greater than atmospheric or ambient pressure, over the composition during the aspiration phase so as entirely to fill the metering chamber.

The device may be applied to any machine for freezing frozen confectionery articles such as, for example:

a machine for freezing in brine, which is rectilinear, rotary, oval or in square movement;

a freezing machine which uses a liquid, gaseous or evaporating refrigerating fluid, which coats the molds or sprays them for reasonably long periods;

a machine in which the molds are transported by a conveyor in a pulsed-air tunnel to effect fast freezing, it being possible for the conveyor to be rectilinear or to be wound, for example, as a simple or double helix, which is flattened or of revolution; or any machine of the above type in which the displacement of the molds is continuous or stepwise.

The device may be applied very simply to existing machines by converting the metering devices so that an overpressure, i.e., greater than atmospheric or ambient pressure, is created in the metering hopper, for example, by closing it by means of a lid, by rendering it gas-tight and by connecting it to a source of fluid, particularly a compressed gas, for example, compressed air. This principle of metering under pressure may apply to various types of metering devices such as, for example, metering devices with a dispensing casing and with vertical or horizontal cylinders, metering devices with valves or metering devices with immersed nozzles of the bottom-up-filler and pencil-filler type.

In FIGS. 1 and 2, a pipe 1, side-connected to the hopper 2, feeds the latter with ice cream at −6° C. to −7° C. emerging from a solidifying environment, e.g., a freezer. A pipe 3 conveys compressed air into the hopper 2 so as to place it under a pressure of about 1.5 to 2 bar. The pressure in the hopper, which is greater than ambient or atmospheric pressure, is regulated by a valve 4 and controlled by a manometer 5. For example, the absolute pressure can be greater than 1 atm. The hopper 2 is closed by a lid 6 and the hopper/lid assembly is non-deformable and preferably gas-tight. The hopper/lid assembly may be, preferably, temperature-controlled. At the bottom of the hopper 2, a pipe 7 delivers the ice confectionery composition to the volumetric metering device 8 which comprises a hollow body 9 or casing in which a cylindrical valve 10, perforated with as many passages 11 as there are metering tracks (for reasons of clarity, only one track is shown), allows communication with the hopper 2 and with the metering nozzle 12 by means of the interposition of the strengthened flexible hose 13, by swinging through a quarter of a revolution. The metering device 8 comprises a metering chamber 14 and a metering piston 15. The rotary valve 10 may be replaced by a set of double slide valves, which fulfil the same function but make the metering device bulkier. A mixer 16 force-feeds the pipe 7 communicating with the casing 9. The nozzle 12 is secured to an up-and-down support (not shown), allowing it to descend into the molds 17 and to rise out of the molds 17. The molds 17 are cooled before and/or after they have been filled by means of a refrigerating vector. Molding may apply to any mold in one or several parts in contact with any liquid, gaseous or solid refrigerating environment such as, for example, brine, a glycolated water solution, pulsed air, liquid nitrogen or solid carbon dioxide. The nozzle 12 may also be secured under a valve (not shown) which, by closing just after metering, prevents too much of the ice cream being metered out or prevents it dripping owing to the residual volume contained in the flexible hose 13.

In FIG. 1, in a production situation, an empty mold 17, passing stepwise on a conveyor line 18 in the direction of the arrow f1 is presented under the nozzle 12. The latter is made to descend to the bottom of the mold 17 according to f2, whilst the cylinder 14 constituting the metering chamber is filled with composition pushed from the hopper 2 by the compressed air via the pipe 7, then the passage 11 of the valve 10, and the piston 15 rises again according to f3.

As indicated in FIG. 2, the valve 10 has swung through a quarter of a revolution, which places the cylinder 14 in communication with the pipe 13 by means of the interposition of the passage 11. The piston 15 descends according to f4 and the precise volume of ice cream contained in the cylinder 14 fills the mold 17 by means of the nozzle 12 which rises progressively according to f5, as filling proceeds.

In FIGS. 3 and 4, the metering principle is the same as that described above, except that the nozzle 19 slides in a dispenser 20 which is integral with the casing 9.

In FIG. 3, the cylinder 14 provides for metering the ice confectionery composition by the descent with ice cream and this is metered out by the descent of the piston 15 according to f6 via the channel 11 and the window 21 made in the body of the dispenser 20, when communicating with the window 22 of the nozzle 19 illustrated as being presented in the bottom of the mold 17. The nozzle 19 is actuated by a pressure cylinder (not shown), which raises it progressively according to f7 during filling.

After the mold 17 has been filled, as shown in FIG. 4, the valve 10 turns through ¾ of a revolution, which places the cylinder 14 in communication with the pipe 7 connected to the hopper by means of the interposition of the passage 11. The piston 15 is then in a position in which it is ready to aspirate and it rises according to f8.

In this case, dead volumes are minimized and the valve 10 is synchronized with the descent and rise of the nozzle, using an automatic program.

According to an operational variant, provision may be made for the nozzle to remain stationary and for the mold to be taken by an up-and-down device, i.e. it is lifted at the start of filling and then progressively lowered during filling.

In the variant of FIG. 5, the metering device is provided with a static nozzle 23 placed directly below the casing 9 in straight connection with the cylinder 14. The three-way rotary valve 24 allows communication between the pipe 7 connected to the hopper, the cylinder 14 and the nozzle 23. During filling, the piston 15 descends according to f9 and meters out the ice cream into the mold 17. The nozzle 23 has a narrow opening 25, for example <4 mm in diameter, which allows the ice cream to be made sufficiently fluid by means of shearing and the mold 17 to be filled satisfactorily. In this variant, there is no longer any need for an up-and-down nozzle support and therefore the overall size is minimized.

In an embodiment which is particularly adapted to a multi-track manufacturing line, not shown for reasons of simplification, a hopper, such as 2, which is common to all the tracks and has a generally cylindrical shape, is arranged horizontally, transverse to the tracks, has two ice-cream supply pipes, such as 1, arranged on each side of the cylinder and exit pipes for the ice cream, such as 7, arranged opposite each track. An agitator/distributor, such as 16, comprises a rotary shaft positioned in the axis of the cylinder and blades secured transversely to the said shaft of the agitator, on either side of the said shaft in a position in which they are staggered with respect to one another. The blades are arranged in an offset manner relative to the exit pipes for the ice cream, opposite spaces located on either side of the said exit pipes. The blades preferably have a length such that their end is in the vicinity of the inner wall of the cylinder, a helical shape and an orientation with an angle which, closer to the central part of the cylinder, is increasingly less pronounced, making it possible for the flows of ice cream originating from the supply pipes to be preferentially directed towards the central part of the cylinder so as to offset the preferential flows towards the ends. In this way, the ice cream is distributed homogeneously between the various exit pipes and is able to force-feed the metering chambers without the creation of any air pockets.

During operation, the agitator/distributor is actuated in slow rotation by means of a motor outside the hopper, engaging on the shaft of the agitator, for example a pneumatic motor, and the seal may be provided, for example, by a lip seal on the motor side and by a packing box on the other side of the cylinder. The hopper is fed continuously. If the level of ice cream rises in the hopper, the air pressure increases in its upper part. This increase in pressure, compared with a reference value, may generate a signal which acts on the closure of a valve, such as 4, or on the reduction of the speed of the pump supplying product from the freezer, so as to reduce its rate of flow.

A major advantage of the above cylindrical hopper is that, owing to its geometry, it may be cleaned by chemical agents and, if appropriate, sterilized, for example using hot water or steam, whilst remaining in situ without dismantling.

The advantages provided by the process and the device over traditional molding means are many:

- it is possible to meter out an ice confectionery composition which contains much more water in the frozen state than in the past, with a corresponding improvement in the texture which is usually encountered only in extruded articles, irrespective of the fat content;
- the freezing time may be reduced by about 30 to 50%, which allows a greater production rate and improved productivity for the line;
- the viscosity of the ice confectionery product, e.g., ice cream is such that the inclusions it contains, if appropriate, may be distributed in uniform manner without settling as in the case of a liquid metered ice cream;
- it is possible to manufacture composite articles by metering out the ice cream by means of a sheathing nozzle, so as to form a shell which remains in place on the wall of the mold, and it is then possible to fill the center so that a frozen confectionery core of a different type is formed thereby producing a contrast in texture and/or taste;
- it is possible to manufacture "three-dimensional" or "non-demoldable" articles by using multi-part molds; and
- the articles, being colder, may be more easily coated, for example with a coating which has a fatty composition, with a water ice, with a sorbet or with an emulsion.

The device and the process have been described in connection with the manufacture of frozen lollies. They may, of course, be used to manufacture other molded articles such as, for example, cones, spades, or tubs. The device has been described with reference to the drawings in connection with one metering track for reasons of simplification. Naturally, a machine in a manufacturing situation may comprise up to 20 or more parallel metering/molding tracks.

The above discussion relates to an embodiment of the invention using a volumetric filler and hopper. In another embodiment of the invention, the dosing system can include a dynamic distributor and a bottom-up feeder to provide molded frozen confectionery products having the smooth texture of a frozen extruded products that are substantially free or completely free of air pockets. Various features noted above can be included or substituted for the specifics of the embodiment discussed below.

In this preferred embodiment, the dosing system can be composed of one or more types of metering devices that facilitate proper filling of the molds with ice confectionery material at a temperature of about −5° C. to about −7° C. At this temperature, the ice confectionery material is typically stiff (i.e., viscous), but still flowable, although this can vary on such factors as the ingredients and the overrun. The main problem due to the ice stiffness, i.e., relatively higher viscosity compared to a liquid and more readily flowable material, is to inhibit or prevent the formation of air pockets in the molds when using the classical dosing techniques to apply the stiff material into the mold. Conventional systems that attempt to mold frozen ice confectioneries result in the formation of air pockets in the mold and molded article and a grainy texture from large ice crystals. Air pockets of greater than 10 volume percent are typical in conventional molding systems.

The present embodiment, however, can achieve frozen ice confectionery products that are substantially free or completely free of air pockets in the molds and molded products. "Substantially free," as used herein to refer to air pockets, typically means that air pockets are present in an average amount of less than 10 volume percent. Preferably, less than 8 volume percent air pockets are formed, more preferably less than about 5 volume percent. In one more preferred embodiment, less than about 3 volume percent air pockets are formed. In one more preferred embodiment, no visible air pockets are formed, while in another no detectable air pockets are formed in the final frozen confectionery product.

Ice crystal sizes according to this embodiment are smaller than conventional ice moldings. This is accomplished by freezing the ice confectionery material before deposition into a mold, which "pre-freezing" permits additional control in minimizing ice crystal size. By forming ice crystals of a suitably small size via such a pre-freezing before molding, a smoother, less icy texture can be obtained. The average ice crystal diameter of this embodiment is less than about 60 $\mu$m, preferably less than about 40 $\mu$m to provide the smooth texture of the invention. Various levels of overrun can be used if desired in forming a frozen ice confectionery article of the invention, but a particularly preferred overrun, especially for ice creams, is approximately 20 to 100 percent. The frozen confectionery articles resulting from this invention and this embodiment are substantially free, or entirely free, of dendrites, which are dendritic crystals that are big and elongated and adversely affect the product texture and consumer perception thereof.

The freezer barrel typically delivers the ice at about −5° C. to −7° C., preferably about −5.5° C. to 6.5° C., more preferably at about −6° C., which temperatures are sufficient low to permit suitably small ice crystal formation as previously discussed. The ice is typically pushed by the freezer pump at a pressure of about 5 to 9 bars, preferably about 6 to 8 bars, to a distributor. The freezer pump delivers the frozen confectionery material at this pressure to overcome the typical pressure losses due to the ice friction in the pipe feeding line, i.e., ice friction arising from small ice particles that have formed within the flowable frozen confectionery material.

The distributor is preferably a rotative distributor that includes a rotor to distribute at least a substantially uniform, preferably uniform, flow of ice to a plurality of flexible pipes. In preferred embodiments, the base of the rotor is conical and the rotor has from about 10 to 24 openings, preferably from about 14 to 20 openings. The openings have a diameter of about 2 mm to 10 mm, and preferably from about 4 mm to 8 mm. An exemplary rotative valve can have 16 openings each of 6 mm diameter. There can typically be anywhere from 2 pipes to 50 pipes or more, although preferably there might be from approximately 5 to 20 flexible pipes. There is typically a plurality of notches at the periphery of the base of the rotative valve. Although the number of notches need not correspond, there can be one notch for each flexible pipe, so when 20 flexible pipes are used there could be 20 notches in the valve to ensure proper distribution. The flexible pipes can be made of any suitable material that retains its flexibility and is unlikely to crack or break under low temperature operation. The role of the rotor is to distribute at least substantially the same amount of flow, preferably the same amount of flow, to each flexible pipe for deposition in the mold. For example, "substantially the same amount" can mean there is less than about a 10 volume percent difference, preferably less than about a 5 volume percent difference, and more preferably less than about a 1 volume percent difference, between any two flexible pipes over a given period of time. This minimizes or avoids the creation of preferential flow to one pipe at the expense of another. For instance, if there is stagnation somewhere, the motion of the slidable filler helps accelerate the flow from place to place to minimize or avoid this stagnation. The rotor can have a variable speed that is sufficiently suitable to ensure proper distribution of the frozen ice confectionery material into the flexible pipes.

The flexible pipes are connected to this slidable filler. The filler is made of a housing with a rotating valve inside. At the base of the housing, fittings typically admit an equivalent number of nozzle pipes adapted to the mold dimensions. These nozzle pipes are significantly narrower than the molds and are lowered into the molds before frozen confectionery material is deposited. The filler housing can optionally, but preferably, include a collector for bypass and/or recycling when the quantity of frozen confectionery material is not exactly that needed to fill the molds, or for cleaning, or both. The housing can also present other fittings (not represented) for a second frozen confectionery material, a sauce that can be provided as a topping, a filling, or both, or a combination of additional materials desired to be molded with the frozen confectionery material. This can advantageously add one or more swirl or other visible patterns into the ice confectionery material, such as when a second different color material is used, to provide a visually appealing swirled or patterned ice confectionery article. The filler is moved with a mechanical system typically made of 2 racks and 2 gear-wheels of any suitable configuration and size. The motion profile of the wheels is adapted to the dosing conditions and the pre-set pattern desired for deposition in the molds. Particularly, the frozen ice confectionery material is pushed by the freezer or other pump, when the valve is opened, at a speed sufficiently slow to minimize or avoid air pockets or over dosing during the up motion of the nozzle pipes.

In operation, the nozzle pipes of the filler are moved down in the molds and the rotating valve is open to let frozen ice confectionery material flow to the bottom of the molds. Then the nozzle pipes are moved up over the course of a set time to fill the mold. For example, the nozzle pipes can be held at the bottom of the molds, or within about 10 percent of the distance from the bottom to the top of the mold, and the molds filled to the top. Then the nozzle pipes can be withdrawn slowly while additional material is added to fill the space the nozzle pipes previously occupied. Another example of a nozzle motion would be to slowly raise the nozzle pipes from bottom to top as soon as the mold filling begins. The motion instructions of the filler come from dedicated software that is called Program Logic Control ("PLC"). The coordination is adjusted and controlled by the way of the servo-drive motor and the PLC system. Thus, the speed of this electric motor can be controlled electronically at each fraction of second to ensure the filler moves in the desired motion pattern to minimize or avoid air pockets in the molds and to optionally provide a desired pattern in the resultant frozen confectionery article. At the end of the dosing, the motion can be accelerated to avoid a tail extension, which is a well known and undesired stretching of the final material flowing out of a nozzle, pipe or the like when the material is greater than a certain viscosity or stickiness. A rapid motion can minimize or avoid tailing, which can result in air pockets in the molds, wasted material should it overflow, and the need for more frequent cleaning of the equipment.

The motion of the filler itself is typically controlled entirely with the servo-driven motor with a specific motion profile, or kinematic, which is provided from dedicated program logic control software. Suitable motion profiles can be pre-programmed to provide a tri-dimensional shape to products in combination with the speed control.

The PLC is used to open the time elapse rotative valve at the same time the nozzle pipes reach the lowest position of the slidable filler assembly. This synchronization helps minimize or avoid air pockets, and any suitable mechanism can be used to open the valve including activation of a sensor, such as at the tip of the nozzle pipes or a toggle switch on the slidable filler itself. The speed of the motor in raising the slidable filler is adjusted by varying the current in the motor in correspondence with the frozen confectionery material filling flow in the mold. The valve is then closed after a defined time, i.e., based on a pre-programmed setting, that corresponds to a course the slidable filler takes and/or to a leveling off of the filling at the top of the mold. Preferably, a rapid acceleration of the motor allows the nozzle pipes to be rapidly freed from the molds while minimizing undesirable tailing.

The molded products can be and preferably are coated in a chocolate coating to provide a visually attractive product. The chocolate or other suitable coating is added after the frozen confectionery product is molded and demolded and can be provided by spraying, dipping, or enrobing. The combination of the program logic control software and the servo-drive motion readily permits such products to be made in reproducible fashion to provide uniformity where desired and to minimize the excess use of raw materials and energy.

FIG. 6 depicts a schematic of this embodiment of the invention, where a continuous freezer 30 accepts a flowable confectionery material and freezes it in continuous fashion. The freezer 30 includes at least one pump to freeze, mix, and transport the frozen ice confectionary material that arrives at inlet 31 and exits the freezer 30 at outlet 36. As depicted, there is a mix pump 32 and an ice pump 35 to chill and transport the confectionery material through the apparatus and into the molds at a pressure greater than atmospheric/ ambient pressure, whichever is higher. The freezer 30 is connected, preferably directly as shown, to a rotative distributor 40 that facilitates distribution of equal amounts of frozen ice confectionary material into each track of a slidable filler 50. The rotative distributor 40 is connected, preferably directly as depicted, to the slidable filler 50 with a plurality of flexible pipes or tubes 45.

The slidable filler 50 includes a motor 52, such as a servo-drive motor, associated with a programmable control logic chip or other programmable device 55 to facilitate control of the discharge of frozen confectionery material into the molds 70 to minimize or avoid air pocket formation therein. For example, a gear wheel 62 and corresponding rack 63 can be used as depicted to facilitate sliding of the filler toward and away from the molds 70. The slidable filler 50 includes a casing having a time elapse rotative valve 60 therein. The rotative valve 60 is disposed in between the connection of each flexible pipe 45 to a corresponding nozzle pipe 65. A collector for recycling 67 is optionally included on or associated with the casing holding the rotative valve 60. The slidable filler 60 also includes a mechanism to slidably move the entire assembly of the flexible pipes 45, casing including rotative valve 60, and nozzle pipes 65. This advantageously permits the molds to be filled from the bottom-up to help minimize or avoid air pockets during formation of the molded frozen confectionery articles.

The term "about," as used herein, should generally be understood to refer to both numbers in a range of numerals. Moreover, all numerical ranges herein should be understood to include each whole integer within the range.

EXAMPLE

The following non-limiting example is merely illustrative of one exemplary embodiment of the invention described herein.

Example 1

Formation of a Frozen Ice Cream Product According to the Invention

An ice cream of 38% dry content by weight, of 80% overrun at a temperature of −6° C. is dosed in molds progressing at a pace of 20 strokes/min. The shape of the molds is trunco-cylindrical (e.g., tapered) of 130 mm height having a nominal volume of 80 ml when filled up to within 15 mm of the upper rim. At the time the signal of filling is given, the molds are stationary. The filling nozzles descend into the molds in 0.2 s and stop 1.5 cm from the bottom. After a delay of 0.15 s with respect to the signal, the time lapse rotary valve opens and the ice cream flows down at an output of 80 ml/s. The rotary valve remains open for 1 s and the mold is filled within 1 s. The compression and expansion phenomena can be disregarded since pressure tends to ambient in the mold at the level of the nozzles and the ice cream is rather thick. The ice cream arrives at the mold at a speed of about 50 cm/s (the dosing nozzle selected here has a diameter of 14 mm and an internal cross-section of 1.5 cm$^2$). The trunco-cylindrical mold has an internal mean diameter of 27 mm and a cross-section of 6 cm$^2$ and is filled within 1 s. The height of the molded product is 115 mm and is filled at a speed of 13.3 cm/s.

Under the motion pattern described above for filling these molds, the product might contain air pockets if the nozzles rise respectively faster than the freezer flow and the nozzles might be submerged if they rise too slowly with respect to the freezer flow. Therefore, the upward speed of the nozzles is an important parameter to ensure that the nozzle speed is substantially the same as the flow of frozen ice confectionery material. At the end of filling, the nozzles exit the molds at a faster speed of 85 cm/s in order to break the thread of ice cream without forming a "tail."

All the above parameters according to the control modes are entered into a control program, i.e., the PLC. The controlling options by nozzle position, timing, and speed vary according to the control modes in order to be able to select the easiest control mode. The parameters are recorded according to a given product formulation, such as the components and exact temperature, and a given type and shape of mold.

Although preferred embodiments of the invention have been described in the foregoing description, it will be understood that the invention is not limited to the specific embodiments disclosed herein but is capable of numerous modifications by one of ordinary skill in the art. It will be understood that the materials used and the mechanical details may be slightly different or modified from the descriptions herein without departing from the methods and compositions disclosed and taught by the present invention.

What is claimed is:

1. An apparatus for preparing frozen ice confectionery articles comprising:
   a freezer comprising a freezer pump that cools confectionery material so as to provide a frozen ice confectionery material and transports the frozen confectionery material through the apparatus;
   a rotative distributor that receives the frozen ice confectionery material from the freezer at a pressure greater than atmospheric pressure and distributes frozen material into each of a plurality of flexible pipes; and
   a slidable filler comprising:
      a motor having a pre-programmable motion pattern to provide a desired pattern of deposition of the material into a plurality of molds while sliding the filler toward and away from the molds;
      a plurality of nozzle pipes operatively associated with the motor, wherein each nozzle pipe corresponds to each of the flexible pipes; and
      a time elapse rotative valve to facilitate control of the amount of frozen confectionery material arriving from the flexible pipes that is discharged to the nozzle pipes while maintaining the frozen ice confectionery material at a pressure greater than atmospheric pressure,
   wherein each mold receives frozen ice confection material from a corresponding nozzle pipe that discharges the same under a pressure greater than atmospheric pressure into the mold to provide a frozen confectionery article in a desired shape.

2. The apparatus of claim 1, wherein the freezer cools and the freezer pump conveys confectionery material to a temperature of to about −5° C. to −7° C.

3. The apparatus of claim 1, wherein the rotative distributor is directly connected to the freezer via a pressurized pipe.

4. The apparatus of claim 1, wherein the rotative distributor meters substantially the same amount of frozen confectionery material into each flexible pipe.

5. The apparatus of claim 1, wherein the gauge pressure on the frozen confectionery material just after exiting the freezer is about 6 bar to 8 bar.

6. The apparatus of claim 1, wherein the gauge pressure on the frozen confectionery material at the rotative distributor is about 3 bar to 7 bar.

7. The apparatus of claim 1, wherein the gauge pressure on the frozen confectionery material at the time elapse rotative valve is about 1.5 bar to 4 bar.

8. The apparatus of claim 1, wherein 5 to 20 nozzle pipes are included with an equivalent number of flexible pipes and molds.

9. The apparatus of claim 1, wherein the desired pattern is tri-dimensional.

10. The apparatus of claim 9, wherein the tri-dimensional pattern is a tapered cylinder, a cone, or a substantially rectangular shape.

11. The apparatus of claim 1, wherein the slidable filler is adapted and configured to deposit sufficient frozen confectionery material to result in an average of less than about 8 volume percent voids remaining in the molds.

12. The apparatus of claim 1, wherein the time elapse rotative valve turns or pivots in a casing and the nozzle pipes slide in such a manner that each descends into the mold at the start of filling, rises during filling, and re-emerges from the container at the end of filing, and wherein the opening of the nozzle is sufficiently narrow to allow the ice cream to be fluidified by means of shearing.

* * * * *